United States Patent
Egan

(10) Patent No.: US 6,642,750 B1
(45) Date of Patent: Nov. 4, 2003

(54) SEQUENCING CIRCUIT FOR APPLYING A HIGHEST VOLTAGE SOURCE TO A CHIP

(75) Inventor: Patrick Kevin Egan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/122,994

(22) Filed: Apr. 15, 2002

(51) Int. Cl.[7] .................................................. H03K 5/22
(52) U.S. Cl. ........................................................ 327/63
(58) Field of Search ............................. 327/63, 68, 69, 327/70, 77, 82, 88, 89

(56) References Cited

U.S. PATENT DOCUMENTS

| | | | | |
|---|---|---|---|---|
| 4,617,473 A | * | 10/1986 | Bingham | 307/66 |
| 5,157,291 A | * | 10/1992 | Shimoda | 327/408 |
| 5,272,393 A | * | 12/1993 | Horiguchi et al. | 327/535 |
| 5,341,034 A | * | 8/1994 | Matthews | 327/534 |
| 5,426,386 A | * | 6/1995 | Matthews et al. | 327/63 |
| 5,703,415 A | * | 12/1997 | Tanaka | 307/66 |
| 5,841,724 A | * | 11/1998 | Ebel et al. | 365/226 |
| 5,886,561 A | * | 3/1999 | Eitan et al. | 327/408 |
| 6,002,295 A | * | 12/1999 | Gens et al. | 327/546 |
| 6,040,718 A | * | 3/2000 | Henry | 327/71 |
| 6,118,188 A | * | 9/2000 | Youssef | 307/43 |

* cited by examiner

*Primary Examiner*—Jeffrey Zweizig
(74) *Attorney, Agent, or Firm*—Joan Pennington

(57) ABSTRACT

A sequencing circuit and sequencing method are provided for applying a highest voltage of first and second system supplies to a chip. The sequencing circuit includes a first transistor coupled between the first system power supply and a power supply input to the chip and a second transistor coupled between the second system power supply and a power supply input to the chip. The sequencing circuit includes a comparator for sensing a highest voltage of the first and second system power supplies. The first transistor and second transistor are coupled to an output of the comparator. When the comparator senses that the first power supply voltage is higher than the second power supply voltage, the first transistor is turned on and couples the first power supply voltage to the power supply input to the chip. Alternately, when the comparator senses that the second power supply voltage is higher than the first power supply voltage, the second transistor is turned on and couples the second power supply voltage to the power supply input to the chip.

10 Claims, 1 Drawing Sheet

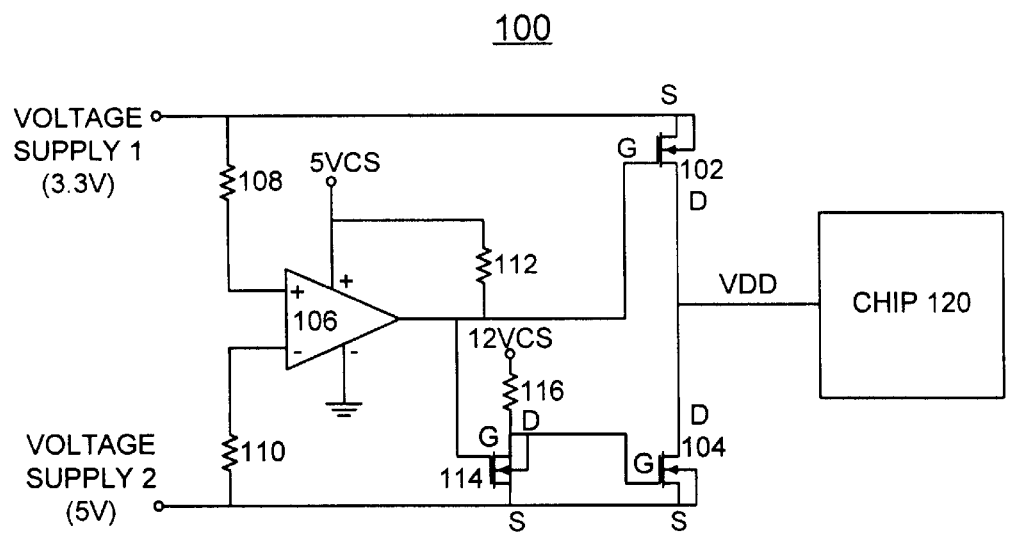

US 6,642,750 B1

SEQUENCING CIRCUIT FOR APPLYING A HIGHEST VOLTAGE SOURCE TO A CHIP

FIELD OF THE INVENTION

The present invention relates generally to power supply circuitry and more particularly, relates to a sequencing circuit for applying a highest voltage source to a chip.

DESCRIPTION OF THE RELATED ART

In known electronic systems, various DC voltage levels often are required that may be provided by multiple different DC supplies. For example, one chip may have a voltage power rail Vdd connected to a 5 volt power supply and include components and input/output (I/O) that use a 3.3 volt power supply. Typically, a system power supply does not instantly provide the correct supply voltages during startup or power down of an electronic system, such as a computer system. Known power supplies have a startup delay when the system is powered on and also a bring down delay when the when the system is powered off.

A sequencing problem exists with some chips included in such known electronic systems. For example, one chip has a voltage power rail Vdd connected to the +5 volts of the system, and this chip also used 3.3 volts and had I/O pins that were also pulled up or wired to other chips that also used the 3.3 volt supply. This chip would latch up if at any time the voltage power rail Vdd is less than any other voltage that was used by this chip. This sequencing problem required that the voltage power rail Vdd be maintained as the highest voltage to the chip during power up and power down of the system.

One way that this sequencing problem has been dealt with in the past is to require the power systems to sequence up the +5 volt supply of the system first and then to power up the 3.3 volt supply next. Then the opposite sequence has been required during power down with the 3.3 volt supply powered down first, then the +5 volts of the system is powered down. This required sequencing of multiple power supplies adds complexity and cost to the power systems and this sequencing of the power supplies may result in other problems with other chips in the system.

A second technique for accommodating this sequencing problem uses in line switches, such as field effect transistors (FETs), to switch the 3.3 volt supply on after the +5 volt supply is powered up. Then the in line switches or FETs switch the 3.3 volt supply off before the +5 volt supply is powered down. This method requires that all chips running off the 3.3 volt supply that are coupled to I/O of the system chips also need to be switched, so that the I/O voltages are also controlled. This method would require a very large switch; for example, a switch rated for 20 Amps or more may be required. It also would sequence other chips in the system in a way that may cause other problems.

SUMMARY OF THE INVENTION

A principal object of the present invention is to provide a sequencing circuit for applying a highest one of system voltage supplies to a chip. Other important objects of the present invention are to provide such sequencing circuit for applying a highest one of system voltage supplies to a chip substantially without negative effect and that overcome many of the disadvantages of prior art arrangements.

In brief, a sequencing circuit and sequencing method are provided for applying a highest applying a highest voltage of first and second system supplies to a chip. The sequencing circuit includes a first transistor coupled between the first system power supply and a power supply input to the chip and a second transistor coupled between the second system power supply and a power supply input to the chip. The sequencing circuit includes a comparator for sensing a highest voltage of the first and second system power supplies. The first transistor and second transistor are coupled to an output of the comparator. When the comparator senses that the first power supply voltage is higher than the second power supply voltage, then the first transistor is turned on and couples the first power supply voltage to the power supply input to the chip. Alternately, when the comparator senses that the second power supply voltage is higher than the first power supply voltage, then the second transistor is turned on and couples the second power supply voltage to the power supply input to the chip.

BRIEF DESCRIPTION OF THE DRAWINGS

The present invention together with the above and other objects and advantages may best be understood from the following detailed description of the preferred embodiments of the invention illustrated in the drawings, wherein:

The single drawing FIGURE is a schematic and block diagram representation of a sequencing circuit in accordance with the preferred embodiment.

DETAILED DESCRIPTION OF THE PREFERRED EMBODIMENT

Having reference now to the drawings, there is shown an exemplary sequencing circuit in accordance with the preferred embodiment generally designated by the reference character 100. Sequencing circuit 100 satisfies the requirement that a chip power supply input labeled Vdd is the highest voltage to a chip 120 at any time. Sequencing circuit 100 connects the chip power supply input Vdd to the highest of the two voltages that the chip 120 receives or has on a chip input/output (I/O).

Sequencing circuit 100 includes a first transistor 102 coupled between a first system power supply labeled VOLTAGE SUPPLY 1 (3.3V) and the chip power supply input VDD to the chip 120 and a second transistor 104 coupled between a second system power supply labeled VOLTAGE SUPPLY 2 (5V) and the power supply input VDD to the chip 120. The first transistor 102 and second transistor 104 of the preferred embodiment are field effect transistors (FETs), such as metal oxide semiconductor FETs (MOSFETs).

Sequencing circuit 100 includes a comparator 106 for sensing a highest voltage of the first and second system power supplies. A first biasing resistor 108 is coupled between a non-inverting input of the comparator 106 and the first system power supply VOLTAGE SUPPLY 1. A second biasing resistor 110 is coupled between an inverting input of the comparator 106 and the second system power supply VOLTAGE SUPPLY 2. Sequencing circuit 100 includes two bias voltages labeled +5VCS and +12VCS. A third biasing resistor 112 is coupled between the reference or bias voltage source +5VCS and an output of the comparator 106. The first transistor 102 and second transistor 104 have a gate input operatively controlled by the comparator 106. An output of the comparator 106 is applied to the gate of the first transistor 102. A third transistor 114 includes a gate connected to the output of the comparator 106. The drain and source of the third transistor 114 are connected between a biasing resistor 116 connected to the reference supply 12VCS and the second system power supply VOLTAGE SUPPLY 2. The second transistor 104 has its gate input operatively controlled by the comparator 106 via the third transistor 114.

The bias voltage source +5VCS coupled to the comparator 106 and the bias voltage source +12VCS coupled to the third transistor are powered up before the first system power supply VOLTAGE SUPPLY 1 and the second system power supply VOLTAGE SUPPLY 2 are powered up. The bias voltages +5VCS and +12VCS remain powered up until the first system power supply and the second system power supply are powered down to zero volts.

In operation, when the comparator 106 senses that the first power supply voltage is higher than the second power supply voltage, the first transistor 102 is turned on and couples the first power supply voltage VOLTAGE SUPPLY 1 (3.3V) to the power supply input VDD to the chip 120. Alternately, when the comparator 102 senses that the second power supply voltage is higher than the first power supply voltage, the second transistor 104 is turned on and couples the second power supply voltage VOLTAGE SUPPLY 2 (5V) to the power supply input to the chip.

As shown in the drawing, the first transistor 102, second transistor 104 and third transistor 114 are N-channel MOSFETs; however it should be understood that other switching devices, such as P-channel MOSFETs or N-channel or P-channel bipolar transistors could be employed.

For a particular application of sequencing circuit 100, the current draw on the power supply input VDD to the chip 120 can be, for example, about 100 ma, so that very small FETs 102 and 104 advantageously are used in the sequencing circuit 100. Sequencing circuit 100 only changes the sequencing to the particular chips 120 that require such sequencing, rather than all chips of an overall system of prior art arrangements. Sequencing circuit 100 is used with chips 120 that require the supply input VDD to be the highest voltage applied to the chip and requires reduced board size as compared to prior art arrangements. Sequencing circuit 100 has no effect on the other chips in a system.

While the present invention has been described with reference to the details of the embodiments of the invention shown in the drawing, these details are not intended to limit the scope of the invention as claimed in the appended claims.

What is claimed is:

1. A sequencing circuit for applying a highest voltage of first and second system power supplies to a chip; said sequencing circuit comprising:

a first transistor coupled between the first system power supply and a power supply input to the chip;

a second transistor coupled between the second system power supply and the power supply input to the chip;

a comparator for sensing a highest voltage of the first and second system power supplies;

a third transistor connected between a bias reference voltage and the second system power supply;

said first transistor, said second transistor, and said third transistor being coupled to an output of said comparator;

responsive to said comparator sensing the highest voltage of the first system power supply, said first transistor being turned on and coupling the first power supply voltage to the power supply input to the chip; and responsive to said comparator sensing the highest voltage of the second system power supply, said second transistor being turned on and coupling the second power supply voltage to the power supply input to the chip;

a bias voltage source coupled to said comparator; said bias voltage source and said bias reference voltage being powered up before the first system power supply and the second system power supply are powered up and said bias voltage source and said bias reference voltage being powered down after the first system power supply and the second system power supply are powered down.

2. A sequencing circuit as recited in claim 1 wherein said first transistor, said second transistor and said third transistors are field effect transistors (FETs).

3. A sequencing circuit as recited in claim 2 wherein said first FET has a source connected to the first system power supply and said second FET has a source connected to the second system power supply and a drain of both said first FET and said second FET is connected to the power supply input to the chip.

4. A sequencing circuit as recited in claim 2 wherein a gate of said first FET is connected to said output of said comparator.

5. A sequencing circuit as recited in claim 2 wherein a gate of said third transistor is connected to said output of said comparator.

6. A sequencing circuit as recited in claim 5 wherein said gate of said second FET is connected to a drain of said third transistor.

7. A sequencing circuit as recited in claim 5 wherein said first transistor, said second transistor, and said third transistor are N-channel metal oxide semiconductor FETs (N-MOSFETs).

8. A sequencing method for applying a highest voltage of first and second power system supplies to a chip; said sequencing method comprising the steps of:

providing a first transistor coupled between the first system power supply and a power supply input to the chip;

providing a second transistor coupled between the second system power supply and the power supply input to the chip;

providing a third transistor connected between a bias reference voltage and the second system power supply;

sensing a highest voltage of the first and second system power supplies using a comparator; said comparator having an output coupled to said first transistor, said second transistor, and said third transistor;

providing a bias voltage source coupled to said comparator;

powering up said bias voltage source and said bias reference voltage before the first system power supply and the second system power supply are powered up;

responsive to sensing the highest voltage of the first system power supply, turning on said first transistor and coupling the first power supply voltage to the power supply input to the chip;

responsive to sensing the highest voltage of the second system power supply, turning on said second transistor and coupling the second power supply voltage to the power supply input to the chip; and powering down said bias voltage source and said bias reference voltage after the first system power supply and the second system power supply are powered down.

9. A sequencing method for applying a highest voltage of first and second system supplies to a chip as recited in claim 8 wherein the step of sensing a highest voltage of the first and second system power supplies includes the step of providing said comparator with inputs coupled to the first and second system power supplies.

10. A sequencing method for applying a highest voltage of first and second system supplies to a chip as recited in claim 9 includes the step of providing said output of said comparator coupled to a gate input of said first transistor and a gate input of said third transistor; and providing a gate of said second transistor coupled to said third transistor.

* * * * *